United States Patent [19]

Cheng

[11] 4,192,900
[45] Mar. 11, 1980

[54] TEXTURIZED STARCH PRODUCTS

[75] Inventor: Hsiung Cheng, San Diego, Calif.

[73] Assignee: Merck & Co., Inc., Rahway, N.J.

[21] Appl. No.: 950,634

[22] Filed: Oct. 12, 1978

[51] Int. Cl.² .............................................. A32L 1/187
[52] U.S. Cl. ..................... 426/579; 127/32; 127/33; 426/464; 426/578; 426/661
[58] Field of Search ............... 426/578, 579, 573, 661, 426/464; 127/32, 33

[56] References Cited

U.S. PATENT DOCUMENTS

| 2,403,547 | 7/1946 | Syplie | 426/103 |
| 2,431,512 | 11/1947 | Schopmeyer | 127/32 |
| 2,791,508 | 5/1957 | Rivoche | 426/550 |
| 3,362,831 | 1/1968 | Szczesniak | 426/104 |
| 3,892,870 | 7/1975 | Wood | 426/573 |
| 3,922,360 | 11/1975 | Sneath | 426/573 |
| 4,025,657 | 5/1977 | Cheng et al. | 426/579 |

FOREIGN PATENT DOCUMENTS 1369198 11/1971 United Kingdom .
1328263 8/1973 United Kingdom .

Primary Examiner—Robert L. Lindsay, Jr.
Attorney, Agent, or Firm—Gabriel Lopez; Raymond Speer; Julian S. Levitt

[57] ABSTRACT

Uniform starch particles prepared from one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan; by adding water, extruding, cutting and drying; useful in preparing retorted or aseptically packaged, tapioca-style pudding and other improved, edible texturized starch products.

18 Claims, No Drawings

TEXTURIZED STARCH PRODUCTS

BACKGROUND OF THE INVENTION

1. Field of the Invention

The present invention is concerned with improved, edible texturized starch products, particularly retorted or aseptically packaged, tapioca-style pudding, containing uniform starch particles prepared from starch and a gelling hydrocolloid.

1. Brief Description of the Prior Art

It is known in the art that sodium alginate becomes a viscous mass when dissolved in water and is capable of solidification by calcium chloride. See, for example, U.S. Pat. Nos. 2,403,547 and 3,093,483. It is also known that milk can be the source of calcium ion. See British Pat. No. 1,328,263. Such alginate gels have been used to prepare simulated fruit products. See, for example, U.S. Pat. No. 3,922,360. In preparing such products, starches have also been utilized, but in a different manner from that of the present invention. See U.S. Pat. Nos. 2,791,508; 3,362,831; and 3,892,870; and British Pat. No. 1,369,198.

An extruded starch product for use in mass produced tapioca-style pudding processed in an automated high temperature canning system, in which the starch particles are resistant to disintegration on cooking, is described in U.S. Pat. No. 4,025,657. However, the process of that patent uses heat extrusion to gelatinize a portion of the starch in order to achieve a binding force, whereas the present invention uses a gelling hydrocolloid as binder.

SUMMARY OF THE INVENTION

Prepackaged foods in single serving sizes have experienced an increase in popularity recently. In order to participate in this increasing market, prepackaged puddings have had to satisfy a number of requirements regarding taste, texture and appearance. This has been particularly true for tapioca-style puddings, which are uniquely characterized by the presence of translucent pearls of gelatinized tapioca starch granules, and by a distinctive texture and taste.

However, modern aseptic packaging techniques which are capable of supplying single serving size prepackaged pudding to the consumer also produce shear and heat stress which result in an unsatisfactory final product when typical starch raw materials are employed. These starch raw materials dissolve in finished products and cause puddings with a stringy texture and soft starch pearls, or "fish eyes". Thus, the desired starch starting material will exhibit a proper balance between texture, and heat and shear stability. In accordance with the practice of the present invention there is provided such a desired starch starting material.

In a typical aseptic packaging process for ready-to-eat puddings, condensed or dehydrated milk is employed, of else a falling film evaporator is used to concentrate milk, which is then flash heated, followed by cooling in a tubular type heat-exchange unit. A further development of this process is the ultra-high temperature, short time (UHTST) method in which the pudding ingredients (milk, flavoring, starch, etc.) are combined into a slurry that is pumped through a series of preheater units. In these preheater units the slurry temperature is raised to 140°-150° F., after which the slurry is removed to a cooker unit where its temperature is raised rapidly to 285°-305° F. for a time of only 8-12 seconds. From the cooker unit the slurry goes to a series of coolers where its temperature is lowered. Following this cooking and cooling, the pudding slurry is aseptically packaged, in cans or other containers, which are then sealed, ready for distribution or consumption.

Among the advantages which are said to characterize the UHTST method are better preservation of product texture, better flavor, and better overall appearance. The UHTST method avoids the long heat treatments which characterize typical retort systems, and thus the natural pudding color is maintained, while at the same time off-flavors caused by the heat itself or by reaction of the metal of the cooking unit under high heat, are avoided. Thus, the UHTST method is one well adapted to a light-colored and bland-flavored pudding such as tapioca.

Retorted puddings are subjected to high temperature sterilization after the individual containers are filled, and the retort method typically requires longer heat treatment than does the UHTST method. Thus, in a typical retort system, the pudding ingredients are heated in a steam bath to about 175° F., after which the containers are filled with the heated ingredients and sealed. The sealed containers are then placed in a continuous retort, and heated at 250° F. with agitation for 10 to 20 minutes or more until sterilization is complete. The time required will depend on the pudding ingredients, size of container, and heat penetration rate. In view of the harshness of pressure and temperature conditions typical of the retort method, a method such as the UHTST is preferred in preparing the tapioca-style pudding of the present invention.

In accordance with the present invention there is prepared an improved retorted or aseptically packaged, tapioca-style pudding wherein the improvement comprises the use therein of uniform starch particles obtained by (a) preparing a dry homogeneous mixture of one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan;

(b) adding water and mixing until smooth (c) cool extruding the mixture through a 1/32 to ¼ inch hole die and cutting to produce starch particles;

(d) where the gelling hydrocolloid selected is sodium alginate or sodium pectate, soaking the starch particles in a solution of calcium, barium, or magnesium ions;

(e) drying the starch particles to a moisture content of from 1 to 12%; and (f) screening the starch particles to pass No. 10 and be retained by No. 14, U.S. Standard Sieve Series;

said starch particles having heat and shear stability during retorting or processing for aseptic packaging, yet swelling without dissolving during said processing to produce a tapioca-style pudding of improved tapioca-like appearance and texture.

The starches employed are selected from tapioca, corn, waxy maize, potato, sago, arrowroot and cereal starches such as rice and wheat. Derivatives of these starches, such as crosslinked etherified and esterified starches, may also be employed. Blends of two or more of these starches together may be employed. However, it is preferred, overall, to use tapioca starch in preparing the improved tapioca-style pudding of the present invention.

The gelling hydrocolloids employed in the present invention are selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan. Two or more of these hydrocolloids may be employed together. Overall, however, it is preferred to employ sodium alginate.

Sodium alginate, the preferred hydrocolloid for use in the present invention, along with sodium pectate, is gelled or cross-linked by contacting it with calcium, barium, or magnesium ions, as is explained in more detail below. It is preferred to employ sodium alginate with a molecular weight range of from 75,000 to 100,000.

The following hydrocolloids employed in the present invention are cold-water soluble but thermal gelling with hot water: hydroxypropylcellulose, methylcellulose, methylhydroxypropylcellulose, and methylethylcellulose. The following hydrocolloids employed in the present invention are hot-water soluble but gelling on cooling: carageenan, furcellaran, agar, gelatin, a mixture of xanthan gum and locust bean gum, and curdlan. Thus, all of these hydrocolloids are gelled during the manufacturing process for the tapioca-style pudding of the present invention.

When the water-soluble gelling hydrocolloid component for the uniform starch particles of the present invention is the preferred sodium alginate or sodium pectate, it is treated with a solution of calcium, barium, or magnesium ions, whereby a cross-linking reaction is initiated which results in gelation of the hydrocolloid together with the starch component of the uniform starch particles, so as to result ultimately in the heat and shear stability of the uniform starch particles which will swell without dissolving during processing for retorting or aseptic packaging to produce a tapioca-style pudding of improved tapioca-like appearance and texture. The most practical method of treating the water-soluble gelling hydrocolloid component with calcium, barium or magnesium ions has been found to be by soaking starch particles of the starch and hydrocolloid components mixture in an aqueous solution of a salt of calcium, barium, or magnesium. For example, it is preferred to simply soak the starch particles in a 3% aqueous solution of calcium chloride.

Since milk is often an ingredient of many texturized starch products, and is almost always an ingredient of puddings, and since milk proteins contain calcium ions which can crosslink the sodium alginate or sodium pectate when these are used as the gelling hydrocolloid, it is also within the scope of the present invention to omit the step of treating the starch particles with calcium, barium or magnesium ions and to rely on the calcium ion present in the milk protein to gel the sodium alginate or sodium pectate during the processing steps for preparing texturized starch products, especially tapioca-style and other puddings.

In addition to the starch and hydrocolloid components of the mixture from which the uniform starch particles are to be prepared, there may be additionally employed a pregelatinized starch thickener as auxiliary binder, for example a pregelatinized, epichlorohydrin crosslinked, hydroxypropylated tapioca starch.

Other commonly employed additives, such as would readily suggest themselves to the artisan of ordinary skill, for example, artificial and natural flavoring and coloring agents, sweetening agents, and dispersing agents, may also be incorporated into the uniform starch particles and improved, edible texturized starch products of the present invention.

The present invention may also be utilized to improve the heat and shear stability, as well as texture, of a number of pregelatinized and partially pregelatinized starch products. The partially pregelatinized starch products are pregelatinized from about 60% to about 80%. An example of such a pregelatinized starch product is Minute Tapioca Starch from General Foods. Such pregelatinized and partially pregelatinized starch products rely upon the pregelatinization for binding action and texture. Nevertheless, they are improved with regard to texture, as well as heat and shear stability, when treated in accordance with the method of the present invention. Such treatment comprises (a) soaking the pregelatinized or partially pregelatinized starch particles in a solution, for example a 1% solution, of sodium alginate or sodium pectate for, for example, three minutes; (b) rinsing with water; (c) soaking the starch particles in a solution, for example a 3% solution, of barium, calcium, or magnesium ions, for example calcium chloride, for, for example, one minute; (d) rinsing with water; and (e) drying.

The first step in preparing the uniform starch particles of the present invention is to blend the components into a homogeneous mixture. This homogeneous mixture is then further mixed with sufficient water to form a dough or paste suitable for extrusion.

The dough thus prepared is preferably cool extruded through a 1/32 to ¼-inch hole die, preferably a 1/16-inch hole die on a commercial forming extruder equipped with a rotary knife cutter. A cooking extruder may also be employed in order to partially gelatinize a portion of the starch which can then serve as a binder. Any suitable commercial extruder may be employed, for example a Bonnot Cooking Extruder manufactured by the Bonnot Company, Kent, Ohio.

The dough is extruded and cut into particles of approximately uniform size by cutting in lengths equal to the diameter of the extruder die.

Where the hydrocolloid employed is sodium alginate or sodium pectate, the starch particles are, preferably, next soaked in an aqueous solution of a salt of calcium, barium, or magnesium, preferably calcium chloride, of from 1 to 10% by weight concentration. The particles are soaked for a period of from 5 to 30 minutes and are then preferably rinsed with water.

The uniform particles are then dried to a moisture content of from 1 to 12%, preferably by drying in a forced-air oven at less than 145° F., preferably from 110° to 130° F. Following drying, greater uniformity of particle size is assured by screening the starch particles to pass a No. 10 and be retained by a No. 14 mesh screen, U.S. Standard Sieve Series.

The present invention will be better understood from the following examples which serve to illustrate the method and products of the present invention.

EXAMPLES 1-6

Two test methods were utilized as follows:

Test Method A (in distilled water):
 1. Measure 200 ml. of boiling distilled water into a beaker containing a 1-inch magnetic stirrer.

2. Heat the contents of the beaker on a hot plate at 300°–335° F. and stir at 150 rpm.
3. Add 10 g. of a sample to be tested and 10 g. of sugar, and heat for 25 minutes.
4. Pour the cooked product into 2000 ml. of cold distilled water, screen through a No. 30 mesh screen, drain for 1 minute, and record the net weight of cooked product as "Fish-Eye Retention Weight".

Test Method B (in milk):

The same procedures as that for Test Method A are followed, except that 200 ml. of boiling milk are substituted for the 200 ml. of boiling water in Step 1, and the 10 g. of sugar are omitted in Step 3.

The samples (but not the controls) were prepared in accordance with the following procedure:
1. Blend all dry ingredients well in a Hobart mixing bowl.
2. Add water and mix until smooth.
3. Cool extrude through a 1/16-inch hole die on a Hobart meat grinder.
4. Cut the extruded strands into 1/16-inch lengths.
5. Soak in 3 percent $CaCl_2$ solution for 30 minutes and rinse with water.
6. Dry in an air-forced oven at 110°–130° F. to a moisture content of less than 12 percent.
7. Screen through No. 10 and No. 14 mesh screens.
8. Collect products on No. 14 mesh screen as samples.

The ingredients for the various samples and the results of Test Methods A and B for these samples are set out in the table of values below.

screen. One sample was soaked in a 1% pectin solution for three minutes and rinsed with water, then soaked in a 3% calcium chloride solution for one minute and rinsed with water. The other sample was soaked in a 0.5% sodium alginate solution for three minutes and rinsed with water, then soaked in a 3% calcium chloride solution for one minute and rinsed with water. Both samples were subjected to Test Method A described above in Examples 1–6, with the result that the Fish-Eye Retention Weight for the pectin treated sample was 67 g., while it was 64 g. for the sodium alginate, calcium chloride treated sample. For both samples the cooked product was firmer in texture and body than the controls for Examples 1–6 above; and it was better in heat and shear stability than the controls.

EXAMPLES 8–14

Various samples, whose ingredients are specified in the table of values below, were prepared in accordance with the procedures described in Examples 1–6 above, except that the sample of Example 11 received no calcium chloride treatment. The controls were commercially available products. The samples were then subjected to a retorting test in accordance with the following procedures:
1. Puddings were retorted at 20 rpm at 260° F. in a Berlin-Chapman retort for 13 minutes to $F_o=8$ (No. 1 Eastern can, 300 grams pudding). Pudding ingredients: 4 percent texturized starch product, 2.5 percent modified waxy maize starch Staley's Thin-N-Thick 99 Starch), 5.0 percent nonfat milk solids, 12.0 percent sugar, 3.0 percent Paramount C

TABLE I

| EXAMPLE NO. | SAMPLE INGREDIENTS | | FISH-EYE RETENTION WEIGHT (GRAMS) | | COMMENTS |
|---|---|---|---|---|---|
| | | | METHOD A | METHOD B | |
| 1[1] (Control) | Minute tapioca starch[2] (through No. 10 mesh, on No. 14 mesh) | | 58 | 60 | Uncooked product dissolves very easily in cold water on stirring. Cooked product is too soft and stringy, does not have good heat and shear stability. |
| 2 | Tapioca starch Pregelatinized, modified starch[3] Water | 57.40% 16.30% 26.30% | 24 | 22 | Uncooked product dissolves very easily in cold water on stirring. Cooked product is extremely soft and stringy. |
| 3 | Tapioca starch Pectin Water | 58.67% 1.33% 40.00% | 66 | — | Cooked product is firmer in texture and body than control; better in heat and shear stability. |
| 4 | Tapioca starch Sodium alginate Water | 61.82% 0.70% 37.48% | 79 | — | Uncooked product does not dissolve in cold water on stirring. Cooked product is much firmer in texture and body than control; has excellent heat shear stability. |
| 5 | Tapioca starch Sodium alginate Pregelatinized, modified starch[3] Water | 59.9% 0.1% 2.0% 38.0% | 75 | — | Uncooked product does not dissolve in cold water on stirring. Cooked product is firmer in texture and body than control; has excellent heat and shear stability. |
| 6[4] | Same as Example 5 | | — | 60 | Similar to Example 5 |

[1]The control was not subjected to the preparation method employed with the other Examples.
[2]From General Foods
[3]Redisol 88 starch, available from A. E. Staley Manufacturing Company
[4]The sample did not receive a calcium chloride treatment; calcium ions present in milk.

EXAMPLE 7

This example illustrates use of the present invention to improve the heat and shear stability, as well as texture, of a commercially available pregelatinized starch product.

Minute Tapioca Starch from General Foods was screened through a No. 10 and onto a No. 14 mesh Fat (a hydrogenated vegetable oil from Durkee), 0.2 percent salt, 0.1 percent DUREM 117 Emulsifier (a mono-diglyceride emulsifier from Durkee), 73.2 percent tap water.
2. Examine pudding's texture and body.
3. Pour retorted pudding into 2000 ml. 160°–170° F. hot water, stir gently to separate and suspend cooked texturized starches in water, screen through a No. 20 mesh screen, wash with 2000 ml. hot water, drain for one minute and record net weight of "Cooked Texturized Starches".

The results of the evaluation of the various samples are summarized in the following table of values.

| EX-AMPLE NO. | SAMPLE INGREDIENTS | | TEXTURE AND BODY OF RETORTED PUDDINGS | NET WEIGHT OF COOKED TEXTURIZED STARCHES (GRAMS) | TEXTURE AND BODY OF COOKED TEXTURIZED STARCHES | COMMENTS |
|---|---|---|---|---|---|---|
| 8[1] (Control) | Granular Tapioca starch[2] | | Slightly stringy and gummy | 45 | Slightly soft | Dissolves easily in milk on mixing; lack of heat and shear stability for canning. |
| 9[1] (Control) | Minute Tapioca[3] | | Very stringy and gummy | 35 | Soft | Dissolves easily in milk on mixing; very poor in heat and shear stability for canning; good only for home-prepared tapioca puddings. |
| 10[1] | Tapioca starch Pregelatinized, modified starch[4] Water | 57.40% 16.30% 26.30% | extremely stringy and gummy | 6 | Very soft | Extremely poor in heat and shear stability for canning; demonstrates the poor binding property of starch. |
| 11[5] | Tapioca starch Pregelatinized, modified starch[4] Sodium alginate Water | 70.94% 2.29% 0.46% 26.31% | Similar to Example 8, slightly shorter | 53 | Similar to Example 8 | Does not dissolve in milk on mixing; good in heat and shear stability for canning; demonstrates the excellent calcium alginate gel binding property. |
| 12 | Same as Example 10 | | Shorter than Examples 8 or 11 | 54 | Firmer than Example 8 or 11 | Does not dissolve in milk on mixing; good in heat and shear stability for canning; further improvement in texture by a calcium chloride soaking step. |
| 13 | Waxy maize starch Pregelatinized, modified starch Sodium alginate Water | 70.94% 2.29% 0.46% 26.31% | Similar to Example 8 | 40 | Similar to Example 8 | Does not dissolve in milk on mixing, good in heat and shear stability for canning. |
| 14 | Corn starch Sodium alginate Water | 71.1% 2.3% 26.6% | Very short in texture and body | 74 | Firm texture similar to cooked long-grain rice; opaque in color | Does not dissolve in milk on mixing; extremely good in heat and shear stability for canning. Rice pudding texture |

[1]No calcium chloride treatment.
[2]Special I from A. E. Staley Manufacturing Company
[3]From General Foods
[4]Redisol 88 Starch from A. E. Staley Manufacturing Company
[5]No calcium chloride treatment (calcium ions from milk solids)

What is claimed is:

1. In a retorted or aseptically packaged, tapioca-style pudding, the improvement comprising uniform starch particles obtained by
   (a) preparing a dry homogeneous mixture of one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan;
   (b) adding water and mixing until smooth;
   (c) cool extruding the mixture through a 1/32 to ¼ inch hole die and cutting to produce starch particles;
   (d) where the gelling hydrocolloid selected is sodium alginate or sodium pectate, soaking the starch particles in a solution of calcium, barium, or magnesium ions;
   (e) drying the starch particles to a moisture content of from 1 to 12%; and
   (f) screening the starch particles to pass No. 10 and be retained by No. 14, U.S. Standard Sieve Series; said starch particles having heat and shear stability during processing for retorting or aseptic packaging, yet swelling without dissolving during said processing to produce a tapioca-style pudding of improved tapioca-like appearance and texture.

2. The product of claim 1 wherein the starch is tapioca.

3. The product of claim 1 wherein the hydrocolloid is sodium alginate.

4. In a retorted or aseptically packaged, tapioca-style pudding containing milk as an ingredient, the improvement comprising uniform starch particles obtained by
   (a) preparing a dry homogeneous mixture of one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan;
   (b) adding water and mixing until smooth;
   (c) cool extruding the mixture through a 1/32 to ¼ inch hole die and cutting to produce starch particles;
   (d) drying the starch particles to a moisture content of from 1 to 12%; and
   (e) screening the starch particles to pass No. 10 and be retained by No. 14, U.S. Standard Sieve Series;
   said starch particles having heat and shear stability during processing for retorting or aseptic packaging, yet swelling without dissolving during said processing to produce a tapioca-style pudding of improved tapioca-like appearance and texture.

5. In a premix for a retorted or aseptically packaged, tapioca-style pudding, the improvement comprising uniform starch particles obtained by
   (a) preparing a dry homogeneous mixture of one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan;
   (b) adding water and mixing until smooth
   (c) cool extruding the mixture through a 1/32 to ¼ inch hole die and cutting to produce starch particles;
   (d) where the gelling hydrocolloid selected is sodium alginate or sodium pectate, soaking the starch particles in a solution of calcium, barium, or magnesium ions;
   (e) drying the starch particles to a moisture content of from 1 to 12%; and
   (f) screening the starch particles to pass No. 10 and be retained by No. 14, U.S. Standard Sieve Series;
   said starch particles having heat and shear stability during processing for retorting or aseptic packaging, yet swelling without dissolving during said processing to produce a tapioca-type pudding of improved tapioca-like appearance and texture.

6. The product of claim 5 wherein the starch is tapioca.

7. The product of claim 5 wherein the hydrocolloid is sodium alginate.

8. Uniform starch particles obtained by
   (a) preparing a dry homogeneous mixture of one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan;
   (b) adding water and mixing until smooth
   (c) cool extruding the mixture through a 1/32 to ¼ inch hole die and cutting to produce starch particles;
   (d) where the gelling hydrocolloid selected is sodium alginate or sodium pectate, soaking the starch particles in a solution of calcium, barium, or magnesium ions;
   (e) drying the starch particles to a moisture content of from 1 to 12%, and
   (f) screening the starch particles to pass No. 10 and be retained by No. 14, U.S. Standard Sieve Series.

9. The product of claim 8 wherein the starch is tapioca.

10. The product of claim 8 wherein the hydrocolloid is sodium alginate.

11. Uniform starch particles obtained by
   (a) soaking pregelatinized or partially pregelatinized starch particles in a solution of sodium alginate or sodium pectate;
   (b) rinsing with water;
   (c) soaking the starch particles in a solution of calcium, barium, or magnesium ions;
   (d) rinsing with water;
   (e) drying the starch particles to a moisture content of from 1 to 12%; and
   (f) screening the starch particles to pass No. 10 and be retained by No. 14, U.S. Standard Sieve Series.

12. An improved, edible texturized starch product containing uniform particles obtained by
   (a) preparing a dry homogeneous mixture of one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan;
   (b) adding water and mixing until smooth
   (c) cool extruding the mixture through a 1/32 to ¼ inch hole die and cutting to produce starch particles;
   (d) where the gelling hydrocolloid selected is sodium alginate or sodium pectate, soaking the starch particles in a solution of calcium, barium, or magnesium ions;
   (e) drying the starch particles to a moisture content of from 1 to 12%; and
   (f) screening the starch particles to pass No. 10 and be retained by No. 14, U.S. Standard Sieve Series.

13. The product of claim 12 wherein the hydrocolloid is sodium alginate.

14. The product of claim 12 wherein the texturized starch product is an imitation rice pudding.

15. The product of claim 12 wherein the texturized starch product is an imitation fruit.

16. A process for making uniform starch particles comprising
   (a) preparing a dry homogeneous mixture of one or more starches selected from tapioca, corn, waxy maize, potato, sago, arrowroot and cereal; and one or more gelling hydrocolloids selected from sodium alginate, sodium pectate, hydroxypropylcellulose, methylcellulose, methylhydroxypropylcellulose, methylethylcellulose, carrageenan, furcellaran, agar, gelatin, a mixture of xanthan gum and locust bean gum, and curdlan;

(b) adding water and mixing until smooth
(c) cool extruding the mixture through a 1/32 to ¼ inch hole die and cutting to produce starch particles;
(d) where the gelling hydrocolloid selected is sodium alginate or sodium pectate, soaking the starch particles strands in a solution of calcium, barium, or magnesium ions;
(e) drying the starch particles to a moisture content of from 1 to 12%; and
(f) screening the starch particles to pass No. 10 and be retained by No. 14, U.S. Standard Sieve Series.

17. The process of claim 16 wherein the starch is tapioca.

18. The process of claim 16 wherein the hydrocolloid is sodium alginate.

* * * * *